United States Patent [19]

Hargreaves

[11] Patent Number: 4,643,139
[45] Date of Patent: Feb. 17, 1987

[54] REED VALVES FOR INTERNAL COMBUSTION ENGINES

[76] Inventor: Bernard J. Hargreaves, 20 Southbank Road, Bury, Lancashire, United Kingdom

[21] Appl. No.: 632,810

[22] Filed: Jul. 20, 1984

[30] Foreign Application Priority Data

Jul. 20, 1983 [GB] United Kingdom ............... 8319533
Jul. 23, 1983 [GB] United Kingdom ............... 8319907

[51] Int. Cl.⁴ ................................................ F02B 75/02
[52] U.S. Cl. .................................. 123/65 V; 123/73 V; 137/855; 251/368
[58] Field of Search ............... 123/65 V, 73 V, 73 A; 251/368, 358, 331; 137/843, 852, 855

[56] References Cited

U.S. PATENT DOCUMENTS

| | | | |
|---|---|---|---|
| 3,200,838 | 8/1965 | Sheaffer | 123/73 V |
| 3,623,700 | 11/1971 | Boteler | 251/331 |
| 3,905,340 | 9/1975 | Boyesen | 173/73 V |
| 3,983,900 | 10/1976 | Airhart | 137/855 |
| 4,014,514 | 3/1977 | Priese et al. | 251/331 |
| 4,228,770 | 10/1980 | Boyesen | 123/65 V |
| 4,318,373 | 3/1982 | Soubis | 123/73 A |

FOREIGN PATENT DOCUMENTS

| | | | |
|---|---|---|---|
| 2386684 | 12/1978 | France | 123/73 A |
| 27010 | 3/1981 | Japan | 123/65 V |
| 79220 | 5/1982 | Japan | 123/65 V |
| 1025713 | 4/1966 | United Kingdom . | |
| 1113982 | 5/1968 | United Kingdom . | |
| 1210521 | 10/1970 | United Kingdom . | |
| 1495907 | 12/1977 | United Kingdom . | |
| 1575579 | 9/1980 | United Kingdom . | |

Primary Examiner—Willis R. Wolfe, Jr.
Assistant Examiner—David A. Okonsky
Attorney, Agent, or Firm—Harry M. Weiss & Associates

[57] ABSTRACT

A reed valve for an internal combustion engine comprises an aperture closable by a resilient valve member composed of an epoxide resin laminate. The laminate preferably includes cotton.

16 Claims, 2 Drawing Figures

REED VALVES FOR INTERNAL COMBUSTION ENGINES

This invention relates to reed valves for internal combustion engines, particularly but not exclusively for the air intakes two-stroke engines.

A conventional reed valve comprises an aperture closed by a resilient flexible member composed of steel or of fibreglass. Suction upon the valve by the engine causes the member to deflect, opening the aperture and admitting air to the engine. Opening and closing of the valve occurs at a rate equal to the rate of revolution of the engine and creates considerable strain on the flexible member. Fragmentation of the member is regularly encountered.

Reed valves having steel flexible members are disadvantageous in that entry into the engine of fragments of the member causes considerable damage.

Fibreglass valve members are more prone to fragmentation than steel members although fibreglass fragments are not so damaging to the engine.

According to the present invention there is provided an internal combustion engine reed valve comprising an aperture closable by a resilient valve member composed of an epoxide resin.

The valve member is preferably in the form of a laminate composed of epoxide resin and a textile material.

Preferred textile materials include natural fibres such as cotton or linen or artificial fibres such as polyethylene terephthalate, for example the fibre sold by ICI under the trade mark Terylene. Laminates comprising paper, asbestos or other fabric may also be used. Use of cotton is especially preferred.

Epoxide resin valve members have a greater range of resonant frequencies than fibreglass members. It is important that the valve member is arranged to resonate at the frequencies of actuation of the valve, that is within the range of r.p.m at which the engine is used.

Epoxide resin textile laminates have a lower density and greater resilience than fibreglass. Resistance to impact fatigue is also greater. The force with which the valve member impinges upon the valve seat is therefore less resulting in reduced fatigue of the member. Epoxide resin also has a superior modulus of elasticity to fibrelgass. The lower density permits use of thicker laminates having a wider range of mechanical properties e.g. resonant frequencies. A particularly preferred laminate has a Youngs modulus of 8.00 GNm$^{-2}$, a density of 1360 kgm$^{-3}$ and a tensile strength of $1.26 \times 10^7$ kgm$^{-2}$.

Furthermore epoxide resin does not exhibit the tendency to disintegration once damage has occurred that is characteristic of fibreglass valve members.

The reed valve may be spaced from the engine to reduce thermal damage to the epoxide.

A particularly preferred epoxide is TUFNOL 6F/45, manufactured by Tufnol Limited.

According to a preferred aspect of the present invention an internal combustion engine reed valve comprises a plurality of resilient valve members abutting in use to close the valve.

Preferably the edges of said valve members abut to close the valve.

The aperture of the valve is defined by the opposing surfaces of the resilient valve members.

Conventional reed valves comprise a valve body having one or more apertures, each of which is closable by a respective resilient valve member. The aperture is defined by a surface of the valve member and a surface of the valve body. Passage of air or of a mixture of air and fuel through the aperture is impeded by the immovable valve body, causing turbulence and reducing the kinetic energy of the flow of fluid.

Use of valves in accordance with the present invention is advantageous in that two surfaces of the resilient valve members which may represent the major proportion of the aperture, can move by flexing to allow passage of fluid. The turbulenece caused by a fixed obstacle is avoided. The kinetic energy of the fluid flow is not expended against an immovable surface. Use of two or more abutting resilient valve members increases the sensitivity of the valve to fluctuations in fluid pressure.

The resilient valve members are preferably disposed symmetrically about the direction of flow of fluid through the valve.

A valve comprising two resilient valve members may be arranged with the said members disposed in a prismatic configuration. The angle between the said members is preferably less than 90°, more preferably between 35° and 65°. An angle of approximately 45° has been found to be particularly appropriate.

A valve comprising three or more resilient valve members may be arranged with the latter disposed in a pyramidal configuration.

A valve may comprise a plurality of pairs of prismatically arranged resilient valve members. The plurality of pairs may be disposed side-by-side in an overall prismatic arrangement.

Immovable side pieces are preferably provided between the resilient valve members. A prismatic arrangement comprising two resilient members may incorporate two triangular side pieces. A prismatic arrangement comprising a plurality of pairs of resilient members may incorporate triangular end pieces. Struts may be provided between adjacent resilient members to abut and support the side surfaces of the latter when the valve is closed.

The side pieces and struts may be provided with flexible valve seats composed, for example, of rubber or other durable material.

The invention is further described by means of example with reference to FIGS. 1 and 2 of the accompanying drawings, of which:

Figure 1:
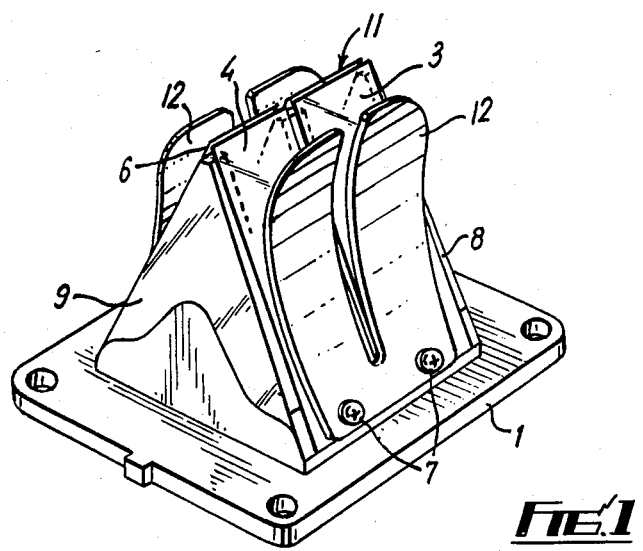
FIG. 1 illustrates a valve in accordance with this invention.

The valve shown in the Figures is adapted for use with a two stroke engine, for example for an outboard motor for a boat.

The valve body 1 contains a generally rectangular inlet 2 and supports two pairs of resilient valve members or reeds 3,4,5,6. The resilient members comprise sheets of a laminate material comprising epoxide resin and cotton manufactured under the Trade Mark Tufnol 6F/45. The resilient members are secured remote from the aperture of the valve by means of screws 7 to side pieces 8, 9 and struts 10. The edges of the resilient members 11 abut when the members are not under tension. The resilient members are arranged at an angle of 45° although angles between 35° and 65° may be used. The resilient members cooperate with the side pieces 8,9 and struts 10 to seal the aperture 2. Curved plates 12 prevent excessive flexing of the resilient members. The curved plates 12, which may be replaced in alternative embodiments by the valve housings, serve to allow progressive curvature of the resilient members rather than hinging of the latter about the fixing screws. Pressure of fluid (air or a mixture of fuel and air) within the aperture 2, caused for example by a vacuum induced on the upper exterior part of the valve as shown in the Figures, causes the resilient members to flex towards the plates 12, allowing the passage of air. Release of the pressure allows the resilience of the members to close the valve. The characteristics of the valve may be chosen by selection of resilient members having an appropriate resilience and thickness. The resonant frequency of the valve may be chosen to match the rate of revolution of an engine by selection of reeds with appropriate dimensions.

Use of a plurality of resilient valve members reduces the degree of flexing required of each member, with a consequent reduction in the stress upon the members.

The following results illustrate the advantages derived from use of the present invention. The usual needs of a series of proprietary internal combustion engines whether steel, fibreglass or otherwise, were replaced with reeds composed of the epoxide-cotton laminate TUFNOL 6F45.

Figure 2:
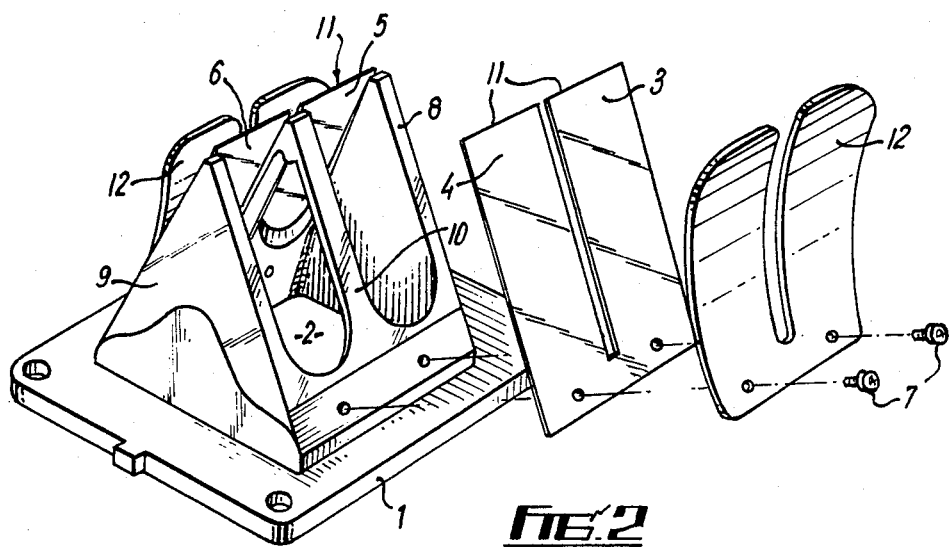
FIG. 2 is an exploded view of the valve.

In each case the performance of the engine was improved. The brake mean effective pressure, torque, brake horsepower and acceleration response were enhanced in each case. The effective power bands was also increased in each case. The high impact fatigue resistance of the laminate allowed larger reed members to be used, allowing a consequent reduction in the number of supporting struts (10 in FIG. 2) thereby increasing the area of the valve.

Replacement of the 0.028 cm thick Boyesen-type steel reeds of an Outboard Marine Company, 3.5 h, U8 engine by 0.078 cm laminate reeds in accordance with the invention increased the effective power band from 6500–8500 rpm to 5500–9500 rpm. This engine normally incorporates a pair of arrays of seven reeds per cylinder. Use of the epoxide laminate enables a pair of arrays of three reeds to be used on each cylinder.

Replacement of the 0.086 cm thick fibreglass reeds of a K.T.M., 500 $cm^3$, single cylinder motorcross motorcycle engine by 0.076 cm laminate reeds increased the effective power band from 3000–7000 rpm to 2500–7500 rpm. Similar results were observed with the corresponding 125 $cm^3$ and 250 $cm^3$ engines.

The effective power band of a Cagiva, 1 cylinder, 125 $cm^3$ engine was increased from 6000–11500 rpm with 0.046 cm fibreglass reeds to 5500–12000 rpm with reeds in accordance with this engine.

The effective power band of a Suzuki 250 $cm^3$, single cylinder motorcross motorcycle engine was increased from 5000–8500 rpm with standard Suzuki reeds to 4000–9250 rpm using 0.073 cm epoxide laminate reeds. Similar results were observed with 80 $cm^3$, 125 $cm^3$, 250 $cm^3$ and 465 $cm^3$ single cylinder Suzuki engines.

The effective power band of a 250 $cm^3$, single cylinder Honda motorcross motorcycle engine was increased from 5000–7500 rpm using standard steel reeds to 4250–9500 rpm with reeds in accordance with this invention. Similar results were observed with other Honda motorcross engines.

The effective power band of a Yamaha 350 L/C YPVS, two cylinder motorcycle engine was increased from 7000–9500 with standard steel reeds to 6000–10000 with 0.061 cm laminate reeds.

The effective power band of a Yamaha 250 L/C YPVS, 2 cylinder motorcycle engine was similarly increased from 7000–9500 rmp to 6000–10000 rpm using 0.063 cm laminate reeds.

The effective power band of a 125 $cm^3$ Kawasaki motorcross motorcycle engine increased from 8500–10500 rmp using standard Kawasaki fibreglass reeds to 8000–11500 rpm using 0.061 cm laminate reeds.

Similar results were observed with 250 $cm^3$ and 500 $cm^3$ Kawasaki motorcross engines.

Use of the reed valve illustrated in the drawings improves the performance of an engine. For example a 247 $cm^3$ test engine was found to produce 54 BHP at 9500 rpm using a conventional valve fitted with Tufnol 6F/45 reed members. Replacement by a valve in accordance with the Figures fitted with Tufnol 6F/45 reed members produced 61.3 BHP at 9500 rpm.

I claim:

1. An internal combustion engine removable reed valve assembly, comprising a plate member means for providing an inlet aperture passing therethrough closable by abutment of a plurality of opposed resilient valve members, said resilient valve members being composed of an epoxide resin extending angularly with respect to the charge flow path and being remotely secured from said inlet aperture, wherein edges of said resilient valve members abut each other to close the valve assembly.

2. A valve assembly as claimed in claim 1, wherein the valve member comprises a laminate of an epoxide resin and a textile material.

3. A valve assembly as claimed in claim 2, wherein the textile material is cotton.

4. A valve assembly as claimed in claim 2, wherein the textile material is made of linen.

5. The valve assembly as in claim 2 wherein said textile material is made of polyethylene terephthalate.

6. The valve assembly as in claim 2 wherein said textile material is made of paper.

7. The valve assembly as in claim 2 wherein said textile material is made of asbestos.

8. A valve assembly as claimed in claim 1, wherein the resilient valve members are disposed symmetrically about a direction of the charge flow through the valve.

9. A valve assembly claimed in claim 8, wherein the resilient valve members are disposed in a prismatic configuration.

10. A valve assembly as claimed in claim 9, wherein the angle between the resilient valve member and said plate member means is less than 90°.

11. A valve assembly as claimed in claim 10, wherein the angle is between 35° and 65°.

12. A valve assembly as claimed in claim 11, wherein the angle is 45°.

13. A valve assembly as claimed in claim 12, comprising a plurality of pairs of prismatically arranged resilient valve members.

14. A valve assembly as claimed in claim 13, wherein the pairs of resilient valve members are disposed side-by-side in an overall prismatic arrangement.

15. A valve assembly as claimed in claim 14 comprising immovable side pieces between the resilient valve members.

16. A valve assembly as claimed in claim 15 wherein three or more resilient valve members are dispsoed in a pyramidal configuration.

* * * * *